United States Patent
Takano et al.

(10) Patent No.: US 6,725,676 B2
(45) Date of Patent: Apr. 27, 2004

(54) REFRIGERANT CYCLE SYSTEM WITH HOT GAS HEATING FUNCTION

(75) Inventors: Yoshiaki Takano, Kosai (JP); Shun Kurata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/457,201

(22) Filed: Jun. 9, 2003

(65) Prior Publication Data

US 2003/0230106 A1 Dec. 18, 2003

(30) Foreign Application Priority Data

Jun. 12, 2002 (JP) ........................................ 2002-171536

(51) Int. Cl.[7] ................................................ F25B 1/00
(52) U.S. Cl. ............................ 62/126; 62/129; 62/228.3
(58) Field of Search ............................ 62/125, 126, 127, 62/129, 130, 156, 160, 228.1, 228.3, 228.4, 196.4, 196.1, 244, 324.6

(56) References Cited

U.S. PATENT DOCUMENTS

6,266,965 B1    7/2001  Takano et al.

*Primary Examiner*—Chen Wen Jiang
(74) *Attorney, Agent, or Firm*—Harness, Dickey & Pierce, PLC

(57) ABSTRACT

In a refrigerant cycle system with a hot gas heater cycle, a pressure difference ($\Delta Pd$) between a high-pressure side refrigerant pressure of the hot gas heater cycle at a start of a heating mode and a high-pressure side refrigerant pressure of the hot gas heater cycle at a predetermined time after the start of the hot-gas heating mode is calculated. When the pressure difference ($\Delta Pd$) is in a predetermined range, it can be determined that the refrigerant is in a normal state. In this case, an electromagnetic clutch is turned on, and a compressor operates. On the other hand, when the pressure difference ($\Delta Pd$) is outside the predetermined range, it can be determined that the refrigerant is in a shortage state. In this case, the electromagnetic clutch is turned off, and the operation of the compressor is stopped.

8 Claims, 6 Drawing Sheets

REFRIGERANT CYCLE SYSTEM WITH HOT GAS HEATING FUNCTION

CROSS REFERENCE TO RELATED APPLICATION

This application is based on Japanese Patent Application No. 2002-171536 filed on Jun. 12, 2002, the disclosure of which is incorporated herein by reference.

FIELD OF THE INVENTION

The present invention relates to a refrigerant cycle system having a hot gas heating function using an interior heat exchanger (evaporator) as a radiator by directly introducing a gas refrigerant (hot gas) discharged from a compressor into the interior heat exchanger. More particularly, the present invention relates to a refrigerant cycle system in which a refrigerant shortage or a refrigerant leakage in a hot-gas heating mode can be accurately determined. The system is suitably used for a vehicle air conditioner.

BACKGROUND OF THE INVENTION

In a conventional vehicle air conditioner, hot water (i.e., engine cooling water) is circulated in a heating heat exchanger during a heating operation in winter to heat air by using the hot water as a heat source. In this case, when the hot water temperature is low, the temperature of air to be blown into a passenger compartment is lowered and thus may be insufficient for a heating capacity.

U.S. Pat. No. 6,266,965 (corresponding to JP-A 2001-12830) proposes a refrigerant cycle system which has a heating function by using a hot gas heater cycle. When the hot water temperature is lower than a predetermined value as just after the start-up of an engine, gas refrigerant (or hot gas) discharged from a compressor is introduced into an interior heat exchanger (evaporator) while bypassing a condenser, so that the heat from the gas refrigerant is released to the air in the interior heat exchanger, and an auxiliary heating function can be obtained.

Figure 8:
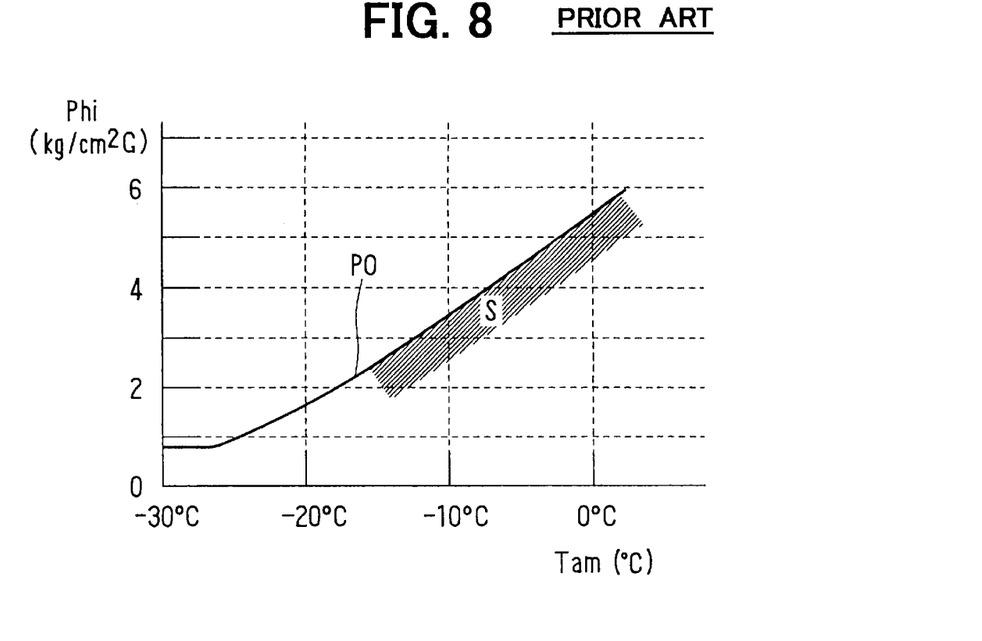
FIG. 8 is a graph for explaining a determination of a refrigerant shortage in a conventional system.

Further, the system proposes a refrigerant shortage determination in a hot-gas heating mode, as shown in FIG. 8. In FIG. 8, a refrigerant shortage area S is determined based on the relationship between outside air temperature Tam and a high-pressure side refrigerant pressure Phi. That is, a boundary line PO between the refrigerant shortage area S and a normal area is determined in accordance with the outside air temperature Tam, and the refrigerant shortage is determined when the high-pressure side refrigerant pressure Phi is lower than the boundary line PO. However, in the refrigerant shortage determination of FIG. 8, because the refrigerant shortage is determined based on the high-pressure side refrigerant pressure Phi, the refrigerant shortage cannot be determined until a predetermined time (e.g., 30–60 seconds) passes after the hot-gas heating mode starts. Therefore, even when the refrigerant shortage is caused in the time period after the start of the hot-gas heating mode, a compressor is operated, and the life of the compressor may be reduced.

Figure 9:
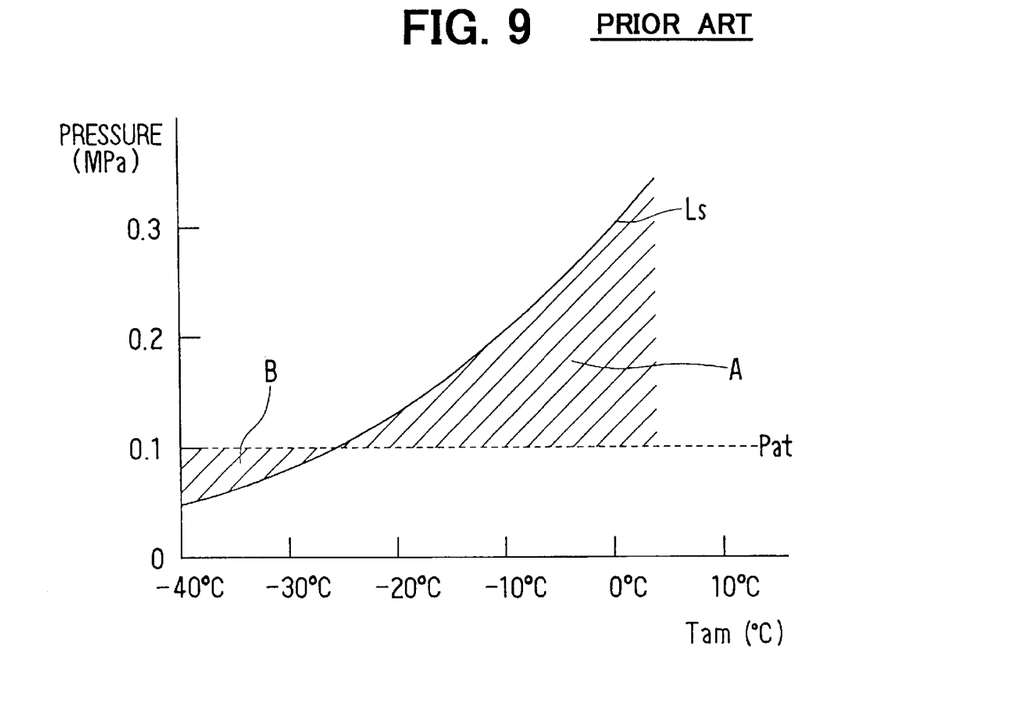
FIG. 9 is a graph for explaining another determination of a refrigerant shortage in the conventional system.

Further, in an another example of this system, refrigerant shortage is determined based on FIG. 9. In FIG. 9, line Ls indicates a saturation line of refrigerant R134, and Pat indicates the atmosphere pressure. When the saturation refrigerant pressure relative to outside air temperature Tam is higher than the atmosphere pressure Pat, the area A is the refrigerant shortage area. On the other hand, when the saturation refrigerant pressure relative to outside air temperature Tam is lower than the atmosphere pressure Pat, the area B is the refrigerant shortage area. However, as shown in FIG. 9, the refrigerant saturation pressure becomes approximately equal to the atmosphere pressure Pat in a low temperature range of −20° C.–−30° C., and it is difficult to determine the refrigerant shortage in the low temperature range.

SUMMARY OF THE INVENTION

In view of the above-described problems, it is an object of the present invention to provide a refrigerant cycle system which can accurately determine a refrigerant shortage during a hot-gas heating mode, in a short time after a start of operation of a compressor.

According to the present invention, a refrigerant cycle system includes a compressor for compressing refrigerant, an exterior heat exchanger disposed outside a compartment, an interior heat exchanger disposed inside the compartment, a first decompression device that decompresses refrigerant in a cooling mode for cooling the compartment by air passing through the interior heat exchanger, and a second decompression device that decompresses refrigerant in a heating mode for heating the compartment by air passing through the interior heat exchanger. The second decompression device is disposed in a hot gas bypass passage through which refrigerant discharged from the compressor is directly introduced into the interior heat exchanger while bypassing the exterior heat exchanger. In the refrigerant cycle system, a switching device is disposed for switching a cooling refrigerant cycle where refrigerant discharged from the compressor is returned to the compressor through the exterior heat exchanger, the first decompression device and the interior heat exchanger so that the cooling mode is set, and a hot gas heater cycle where the refrigerant discharged from the compressor is directly introduced to the interior heat exchanger through the hot gas bypass passage so that the hot-gas heating mode is set. Further, a control unit for controlling operation of the compressor includes: calculation means for calculating a pressure difference between a pressure of a high-pressure refrigerant in the hot gas heater cycle before being decompressed at a start time of the hot-gas heating mode, and a pressure of the high-pressure refrigerant at a predetermined time after the start of the hot-gas heating mode; and determining means for determining whether a refrigerant amount in the hot gas heater cycle is in a normal state or a shortage state. The determining means determines the normal state of the refrigerant amount when the pressure difference is within a predetermined range, and determines the shortage state of the refrigerant amount when the pressure difference is outside the predetermined range. Generally, the predetermined time after the start of the hot-gas heating mode is a short time (e.g., 5 seconds). Therefore, the refrigerant shortage state can be accurately determined for a short time after the start of the compressor.

Preferably, the predetermined range has an upper limit value and a lower limit value. Further, the determining means determines the shortage state of the refrigerant amount when the pressure difference is larger than the upper limit value or lower than the lower limit value, when temperature of outside air is equal to or lower than a predetermined outside temperature. Therefore, even when the temperature of outside air is at a low temperature lower than −10° C., the refrigerant shortage can be accurately determined.

The control unit stops the operation of the compressor when the determining means determines the shortage state of the refrigerant amount. Therefore, it can prevent the compressor continuously operates for a long time in a shortage state of lubricating oil due to the refrigerant shortage, and the life of the compressor can be improved. Preferably, the predetermined range is corrected by a rotation speed of the compressor. Therefore, the refrigerant shortage can be more accurately determined.

When the refrigerant cycle system is used for a vehicle air conditioner, the compressor is driven by an engine of the vehicle. In this case, when the determining means determines the normal state of the refrigerant amount, the control unit maintains a determination output of the normal state of the refrigerant amount until information relative to temperature of the engine becomes a state corresponding to a temperature equal to or lower than a predetermined temperature. Therefore, it can prevent the shortage state of the refrigerant amount from being incorrectly determined by a temperature increase of an engine room due to heat radiation from the engine. Alternatively, the control unit starts the hot-gas heating mode to be operatively linked with a start operation of the engine, and the determining means determines the normal state or the shortage state of the refrigerant amount in the hot gas heater cycle. Even in this case, it can prevent the shortage state of the refrigerant amount from being incorrectly determined by a temperature increase of the engine room due to heat radiation from the engine.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Preferred embodiments of the present invention will be described hereinafter with reference to the accompanying drawings.

First Embodiment

Figure 1:
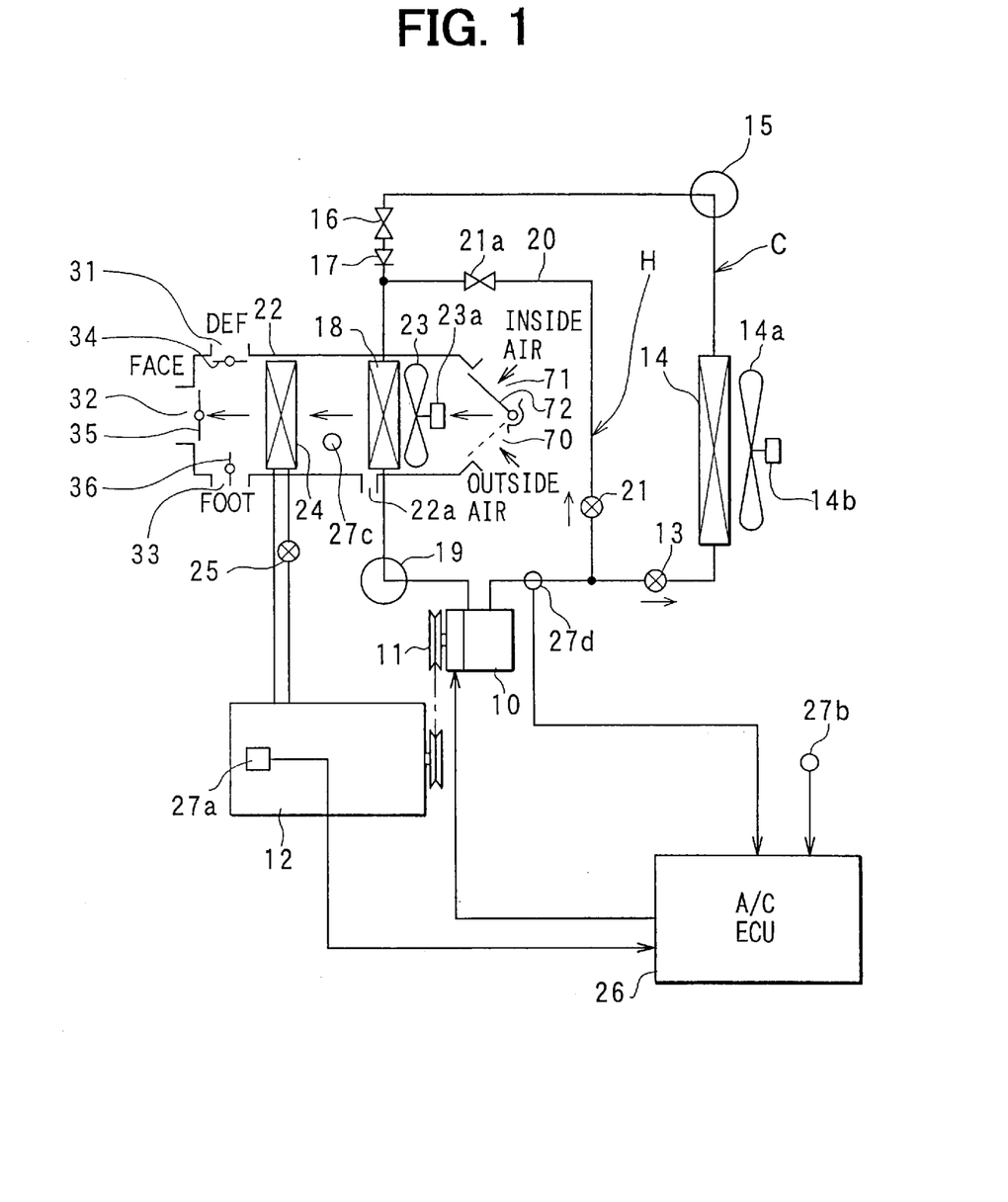
FIG. 1 is a schematic diagram showing a general structure of a refrigerant cycle system according to a first embodiment of the present invention.

FIG. 1 shows a general structure of a vehicle air conditioner with a refrigerant cycle system. A compressor 10 is driven through an electromagnetic clutch 11 by a water-cooled vehicle engine 12, and is constructed, for example, by a fixed displacement type swash plate compressor.

The discharge side of the compressor 10 is connected to a condenser 14 through a solenoid valve 13 for cooling. The outlet side of the condenser 14 is connected to a liquid receiver 15 for separating the refrigerant into gas refrigerant and liquid refrigerant, and the liquid refrigerant is stored in the receiver 15. The condenser 14 is an exterior heat exchanger which is arranged together with the compressor 10 or the like in a vehicle engine room. The condenser 14 exchanges heat with the outside air (or cooling air) blown by an electric cooling fan 14a. The electric cooling fan 14a is driven by an electrical motor 14b.

Moreover, the outlet side of the liquid receiver 15 is connected to a thermal expansion valve 16 that is a pressure reducing device for cooling. The outlet side of this thermal expansion valve 16 is connected through a check valve 17 to an evaporator 18. The outlet side of the evaporator 18 is connected through an accumulator 19 to the suction side of the compressor 10.

An ordinary cooling refrigerating cycle C is constructed of a closed circuit from the discharge side of the above-mentioned compressor 10 to the suction side of the compressor 10 through the solenoid valve 13 for cooling, the condenser 14, the liquid receiver 15, the thermal expansion valve 16, the check valve 17, the evaporator 18 and the accumulator 19, in this order.

The thermal expansion valve 16 regulates its valve opening (or refrigerant flow rate) so that the degree of superheat of the outlet refrigerant of the evaporator 18 can be kept at a predetermined value in an ordinary refrigerating cycle operation (or in a cooling mode). The accumulator 19 separates the refrigerant into the gas refrigerant and the liquid refrigerant, so that the gas refrigerant and a small quantity of liquid refrigerant (in which the oil dissolves) in the vicinity of the bottom are sucked into the compressor 10.

On the other hand, between the discharge side of the compressor 10 and the inlet side of the evaporator 18, a hot gas bypass passage 20 through which refrigerant is directly introduced into the evaporator 18 while bypassing the condenser 14 and the like is provided. A solenoid valve 21 for heating and a throttle 21a are disposed in series in the hot gas bypass passage 20. The throttle 21a is a pressure reducing unit for the heating operation. The throttle 21a can be constructed by a fixed throttle such as an orifice or a capillary tube. A hot gas heater cycle H for the heating operation is constructed of a closed circuit from the discharge side of the compressor 10 to the suction side of the compressor 10 through the solenoid valve 21 for heating, the throttle 21a, the evaporator 18 and the accumulator 19, in this order.

An air conditioning case 22 of the vehicle air conditioner defines an air passage through which air flows into a passenger compartment. The air is blown in the air conditioning case 22 by an electric air conditioning blower 23. The air conditioning blower 23 is shown by an axial-flow type to simply show it, but, in reality, is a centrifugal blower having a centrifugal fan. The air conditioning blower 23 is rotated by a blower motor 23a controlled by a blower drive circuit. Here, it is possible to change the quantity of air blown by the blower 23 in the embodiment continuously or stepwise by adjusting a blower control voltage applied to the blower motor 23a.

Further, on the suction side of the air conditioning blower 23a, an outside air suction port 70 for sucking air outside the passenger compartment (hereinafter referred to as "outside air"), and an inside air suction port 71 for sucking air inside the passenger compartment (hereinafter referred to as "inside air") are provided. The inside air suction port 71 and the outside air suction port 70 are opened and closed by an inside air/outside air switching door (inside air/outside air switching means) 72. Here, the inside air/outside air switching door 72 is driven via a link mechanism (not shown) by an actuator such as a servo-motor to switch at least an outside air suction mode for sucking the outside air from the outside air suction port 70 and an inside air suction mode for sucking the inside air from the inside air suction port 71.

The evaporator 18 is an interior heat exchanger which is disposed in the air conditioning case 22. The refrigerant is circulated in the cooling mode by the refrigerating cycle C for the cooling operation to cool the air blown by the air conditioning blower 23 through the refrigerant evaporation (heat absorption) in the evaporator 18. On the other hand, in the hot-gas heating mode, a hot gas refrigerant (hot gas) discharged from the compressor 10 flows into the evaporator 18 through the hot gas bypass passage 20 to heat the air, so that the evaporator 18 functions as a radiator.

Here, in the air conditioning case 22, a discharge port 22*a* for discharging the condensed water generated in the evaporator 18 is provided at the lower portion of the evaporator 18, so that the condensed water is discharged to the outside of the passenger compartment through a discharge pipe (not shown) connected to the discharge port 22*a*.

In the air conditioning case 22, at the downstream side of the evaporator 18 in the air flow direction, a hot-water type heating heat exchanger 24 for heating the air from the evaporator 18 by using the hot water (engine cooling water) from the vehicle engine 12 as a heat source is disposed. A hot water circuit from the vehicle engine 12 to the heating heat exchanger 24 is provided with a hot water valve 25 for controlling the flow of the hot water.

By the way, the hot water type heating heat exchanger 24 constitutes a main heating unit for heating the passenger compartment. Relative to the main heating unit, the evaporator 18 (interior heat exchanger) functioning as a heat radiator by the hot gas heater cycle H constitutes an auxiliary heating unit.

On the other hand, on the most downstream side of the air conditioning case 22 in the air flow direction, plural air outlet ports 31–33 are provided. The plural air outlet ports 31–33 includes a defroster (DEF) blowing port 31 for blowing out conditioned air toward the inside surface of the vehicle front windshield, a face (FACE) blowing port 32 for blowing out conditioned air (mainly, cooled air) toward the face portion (upper half of the body) of an occupant, and a foot (FOOT) blowing port 33 for blowing out conditioned air (mainly, warm air) toward the foot portion (lower half of the body) of the occupant. Moreover, a plurality of mode switching doors 34–36 for selectively opening/closing these blowing ports 31–33 are provided. Here, these mode switching doors 34–36 construct an air-outlet mode switching unit, and are driven by an actuator such as a servo-motor via a link mechanism (not shown).

An air conditioning electronic control unit (herein after referred to as "ECU") 26 is constructed of a microcomputer and its peripheral circuits, and performs a predetermined computation in accordance with preset programs to open and close the solenoid valves 13, 21 and to control the actions of the remaining electronic devices (11, 14*a*, 23, 25 and the like).

Figure 2:
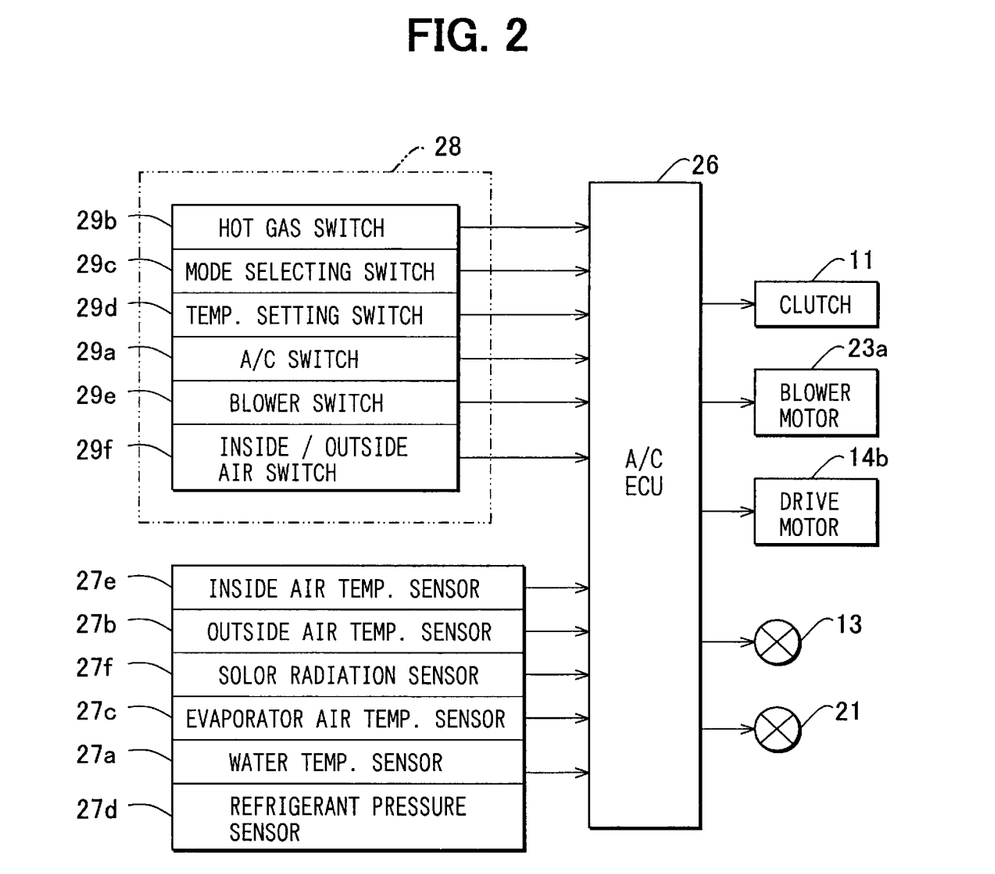
FIG. 2 is a block diagram of an electric control of the first embodiment.

FIG. 2 is an electric control block diagram of the first embodiment. Detection signals are applied to the ECU 26 from a set of sensors including a water temperature sensor 27*a* of the vehicle engine 12, an outside air temperature sensor 27*b*, an air temperature sensor 27*c* of the evaporator 18, and a pressure sensor 27*d* of a compressor discharge pressure, an inside air temperature sensor 27*e*, and a solar radiation sensor 27*f* for detecting the amount of solar radiation into the passenger compartment.

Also, control signals of a group of control switches 29*a*–29*f* are applied to the ECU 26 from an air conditioning operation panel 28 that is disposed in the vicinity of a dashboard in the passenger compartment. That is, an air conditioning switch 29*a* commands the start/stop of the compressor 10 in the refrigerating cycle, and functions as a cooling switch for setting the cooling mode. A hot gas switch 29*b* sets the hot-gas heating mode by the hot gas heater cycle H and functions as a heating switch.

Further, the air conditioning operation panel 28 is provided with a blowing mode switching switch 29*c* for switching the blowing mode of the air conditioner, a temperature setting switch (temperature setting unit) 29*d* for setting the temperature in the passenger compartment at a desired temperature, a blower switch 29*e* for commanding turning on/off the blower 23 and switching the amount of air, and an inside air/outside air selection switch 29*f* for commanding switching between the outside air suction mode and the inside air suction mode.

Next, in the above construction, the operation of the above embodiment will now be described. First, the operation of the refrigerating cycle system will be described. When the air conditioning switch 29*a* is turned on to set the cooling mode, the solenoid valve 13 for cooling is opened and the solenoid valve 21 for heating is closed by the ECU 26. Thus, when the electromagnetic clutch 11 becomes in the connecting state and the compressor 10 is driven by the engine 12, the gas refrigerant discharged from the compressor 10 flows through the solenoid valve 13 for cooling, which is in the open state, into the condenser 14.

In the condenser 14, the refrigerant is cooled and condensed by the outside air that is blown by the cooling fan 14*a*. Then, the refrigerant having passed through the condenser 14 is separated by the liquid receiver 15 into the gas refrigerant and the liquid refrigerant. The separated liquid refrigerant is exclusively reduced in pressure by the thermal expansion valve 16 so that a gas-liquid two-phase refrigerant with low temperature and low pressure is obtained.

Next, the low-pressure refrigerant passes through the check valve 17 and flows into the evaporator 18 and evaporates by absorbing heat from the air blown by the blower 23. The air cooled in the evaporator 18 flows into the passenger compartment to cool the passenger compartment. The gas refrigerant evaporated in the evaporator 18 is sucked into the compressor 10 through the accumulator 19 to be compressed in the compressor 10.

When the hot gas switch 29*b* is turned on in winter to set the hot-gas heating mode by using the hot gas heater cycle H, the solenoid valve 13 for cooling is closed and the solenoid valve 21 for heating is opened by the ECU 26 so that the hot gas bypass passage 20 is opened. As a result, the high-temperature gas refrigerant (or the superheated gas refrigerant) discharged from the compressor 10 passes through the heating solenoid valve 21 in the open state and is reduced in pressure by the throttle 21*a* and then flows into the evaporator 18. In other words, the superheated gas refrigerant (hot gas) from the compressor 10 bypasses the condenser 14 and the like and directly flows into the evaporator 18.

At this time, the check valve 17 prevents the gas refrigerant from flowing from the hot gas bypass passage 20 to the thermal expansion valve 16. As a result, in the hot-gas heating mode, the refrigerating cycle is run by the closed circuit (i.e., the hot gas heater cycle H) of the discharge side of the compressor 10, the solenoid valve 21 for heating, the throttle 21a, the evaporator 18, the accumulator 19, and the suction side of the compressor 10.

Moreover, the superheated gas refrigerant having been reduced in pressure by the throttle 21a heats the blown air by releasing its heat to the blown air in the evaporator 18. Here, the heat quantity to be released from the gas refrigerant in the evaporator 18 corresponds to the compression workload of the compressor 10. The gas refrigerant having released its heat in the evaporator 18 is sucked into the compressor 10 to be compressed after passing through the accumulator 19.

When the hot water temperature is low as just after the start-up of the engine 12, the air conditioning blower 23 is subjected to a warming-up control such that it is started at a small quantity of air. By flowing the hot water through the hot water valve 25 into the hot water type heating heat exchanger 24, the blown air having heated by the evaporator 18 can be further heated in the heating heat exchanger 24. Therefore, even in the cold weather, the warm air, that is heated by both the evaporator 18 and the hot water type heating heat exchanger 24 to have higher temperature, can be blown into the passenger compartment.

Figure 3:
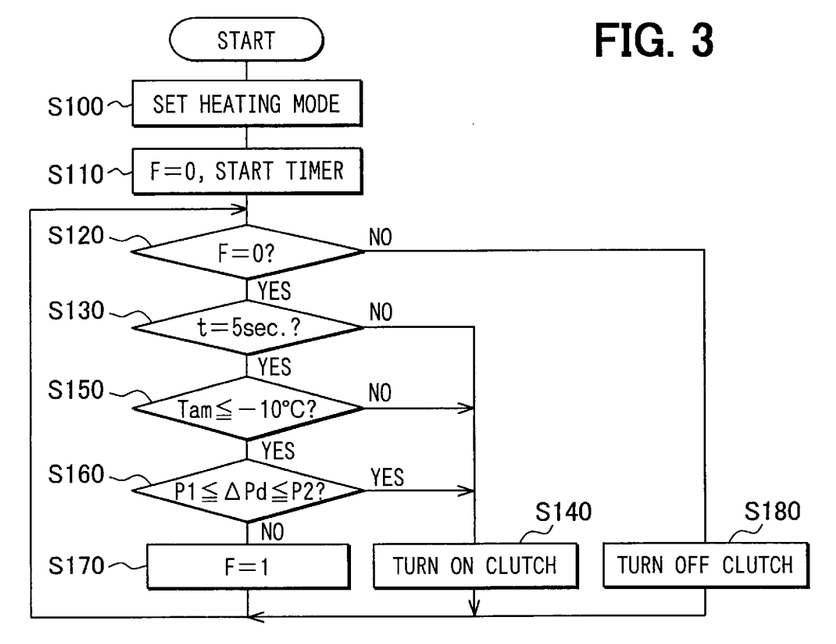
FIG. 3 is a flow diagram for determining a refrigerant shortage in a hot-gas heating mode according to the first embodiment.

Next, operation control in the hot-gas heating mode of the hot gas heater cycle H in accordance with the first embodiment will be described specifically with reference to FIG. 3. The control routine of FIG. 3 is started by starting (by turning ON the ignition switch) of the vehicle engine 12 and by turning on the hot gas switch 29b of the air conditioning operation panel 28. First, at step S100, the solenoid valve 13 for cooling is closed and the solenoid valve 21 for heating is opened, so that the hot-gas heating mode with the hot gas heater cycle H is set. Next, at step S110, initialization of flag F and timer t is performed. That is, the flag F is set at 0, and the timer t is set at 0. Then, the count of the timer t starts.

Next, at step S120, it is determined whether or not the flag F is zero. Because the flag F is set at zero at step S110, the determination at step S120 is YES, and the control program moves to step S130. At step S130, it is determined whether the timer t is at a predetermined time (i.e., t=5 seconds). At the time just after the setting of the hot-gas heating mode, the determination at step S130 is NO. Therefore, at step S140, the electromagnetic clutch 11 is turned on at step S140. Thus, in this case, the compressor 10 operates, and refrigerant circulates in the hot gas heater cycle.

When the timer t is at the predetermined time (e.g., 5 seconds) after the hot-gas heating mode is set, the determination at step S130 is YES, and it is determined whether or not the outside air temperature Tam is equal to or lower than a predetermined low temperature (e.g., −10° C.). When the outside air temperature Tam is equal to or lower than the predetermined low temperature (e.g., −10° C.), it is determined whether the refrigerant is in a normal state or in a shortage state at step S160.

The normal state or the shortage state (i.e., abnormal state) of the refrigerant is determined based on a change value ΔPd (i.e., pressure difference) of the high-pressure side refrigerant. Here, the change value ΔPd is a pressure difference between a high-pressure side refrigerant pressure of the hot gas heater cycle H at a start time (timer time t=0) of the hot-gas heating mode and a high-pressure side refrigerant pressure of the hot gas heater cycle H at the predetermined time (e.g., t=5 seconds) after the start of the hot-gas heating mode. Further, the high-pressure side refrigerant pressure of the hot gas heater cycle is a refrigerant pressure between a discharge side of the compressor 10 and the throttle 21a for heating, and is detected by the pressure sensor 27d.

Figure 4:
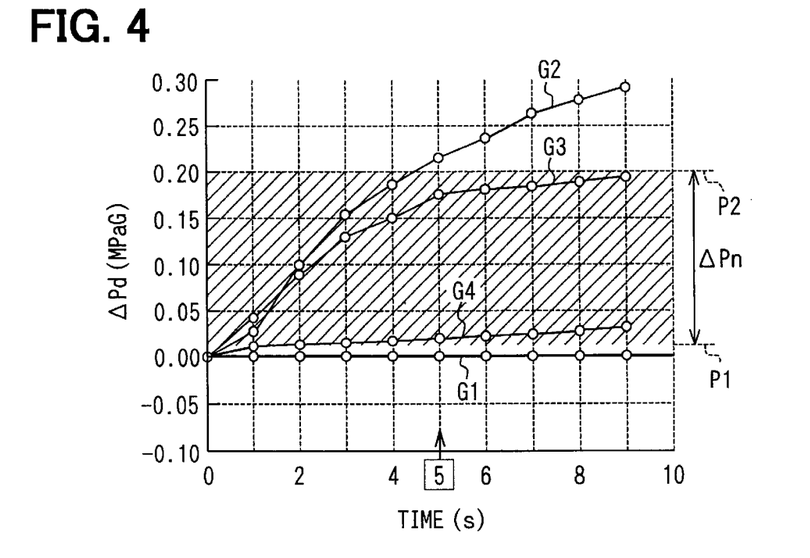
FIG. 4 is a graph for explaining a determination of the refrigerant shortage according to the first embodiment.

When the refrigerant amount in the hot gas heater cycle H is normal without a damage in a high-pressure refrigerant pipe and a low-pressure refrigerant pipe, at the predetermined time (e.g., 5 seconds) after the start of the hot-gas heating mode, the change value ΔPd of the high-pressure side refrigerant pressure is in a pressure increase range ΔPn of the refrigerant normal state shown in FIG. 4. The pressure increase range ΔPn in the refrigerant normal state is determined by a lower limit value P1 (e.g., 0.01 Mpa) and an upper limit value P2 (e.g., 0.20 Mpa).

Accordingly, at step S160, it is determined whether or not the change value ΔPd of the high-pressure side refrigerant pressure is in the range between P1 and P2 (i.e., P1≦ΔPn≦P2). When the determination at step S160 is YES, it is determined that the refrigerant amount sealed in the hot gas heater cycle is normal, and the electromagnetic clutch 11 is turned on at step S140. In this case, the operation of the compressor 10 is continued.

In FIG. 4, the high-pressure side refrigerant pressure at the start of the hot-gas heating mode is set at 0 Mpa as a standard value. When the high-pressure refrigerant pipe of the hot has heater cycle H is damaged, the high-pressure side refrigerant pressure does not increase, and the change value ΔPd of the high-pressure side refrigerant pressure becomes zero, as shown by the graph line G1 in FIG. 4. That is, the high-pressure side refrigerant pressure is generally maintained at 0 Mpa as shown by the graph line G1 of FIG. 4. In this case, the change value ΔPd is smaller than the lower limit value P1 in the pressure increase range ΔPn of the refrigerant normal state, and the determination at step S160 is NO. Accordingly, in the case of the graph line G1, a damage of the high-pressure refrigerant pipe can be determined.

On the other hand, in a case where the outside air temperature Tam is equal to or lower than −10° C., when the low-pressure refrigerant pipe of the hot gas heater cycle H is damaged, the compressor 10 sucks and compresses air having a density larger than that of refrigerant, and the high-pressure side refrigerant pressure becomes higher than the pressure in the refrigerant normal state as shown by the graph line G2 in FIG. 4. Accordingly, at the predetermined time (e.g., 5 seconds) after the start of the hot-gas heating mode, the change value ΔPd the high-pressure side refrigerant pressure becomes larger than the upper limit value P2 of the pressure increase range ΔPn. As a result, the determination at step S160 is NO. In this case, the flag F is set at 1 at step S170, and the determination at step S120 is NO. Accordingly, the electromagnetic clutch 11 is turned off at step S180, and the compressor 10 is stopped. In FIG. 4, the graph line G3 shows a state where the rotation speed of the compressor is 4000 rpm and the outside air temperature Tam is −10° C., and the graph line G4 shows a state where the compressor is in idling and the outside air temperature Tam is −10° C. The state, where the flag F is 1, is maintained until the next initialization of the flag F. That is, the flag F is maintained at 1 until the next initialization of F=0 is performed for the next start of the hot-gas heating mode. Therefore, the OFF state of the electromagnetic clutch 11 is also maintained until the next start of the hot-gas heating mode is performed.

In the first embodiment, the refrigerant shortage is determined based on the change value ΔPd (i.e., pressure difference) of the high-pressure side refrigerant pressure after the start of the hot has heater cycle. That is, the refrigerant shortage is determined based on whether or not the change value ΔPd of the high-pressure side refrigerant pressure is in a predetermined range at the predetermined short time of about 5 seconds after the start of the hot-gas heating mode. Further, when the refrigerant shortage is determined, the operation of the compressor 10 is immediately stopped. Accordingly, when the refrigerant shortage is caused in the cycle due to a refrigerant leakage or the like, it can prevent the compressor 10 operates with a shortage of lubricating oil, thereby preventing a reduce of the life of the compressor 10 due to the shortage of the lubricating oil.

When the refrigerant amount in the hot gas refrigerant cycle is normal at the predetermined short time (e.g., 5 seconds) of the timer after the start of the hot-gas heating mode, the determination at step S160 is YES, and the state of F=0 is maintained. When the predetermined short time (e.g., 5 seconds) passes, the control program moves from step S130 to step S140, and the operation state (ON state) of the electromagnetic clutch 11 is maintained, and the operation state of the compressor 10 is also maintained.

Further, when the outside air temperature Tam is higher than −10° C. at step S150, the control program moves from step S150 to step S140, and the operation of the compressor 10 is maintained. In this case, the determination of the refrigerant shortage at step S160 is not performed. In a case where R134a is used as the refrigerant, when the outside air temperature Tam is lower than −10° C., the density of air is smaller than that of the refrigerant. Therefore, when the low-pressure refrigerant pipe is damaged, the change value ΔPd is not larger than the upper limit value P2 in FIG. 4. On the other hand, in a case where the outside air temperature Tam is higher than −10° C., when the determination of the refrigerant shortage at step S160 is performed, a damage in the low-pressure refrigerant pipe may be incorrectly determined.

Accordingly, when the outside air temperature Tam is higher than −10° C., the refrigerant shortage can be determined based on a comparison between the saturation refrigerant pressure relative to the outside air temperature and the high-pressure side refrigerant pressure. For example, in this case, when the refrigerant pressure in the refrigerant cycle system is lower than the saturation refrigerant pressure determined by the outside air temperature, the pressure decrease in the refrigerant cycle system can be determined, and the refrigerant shortage can be determined. The refrigerant shortage determination at the outside air temperature higher than −10° C. is not shown in the flow diagram of FIG. 3.

Further, at step S130 in FIG. 3, the predetermined short time of the timer is set at 5 seconds, for example. However, the predetermined short time of the timer can be set at (5+a) seconds.

Figure 5:
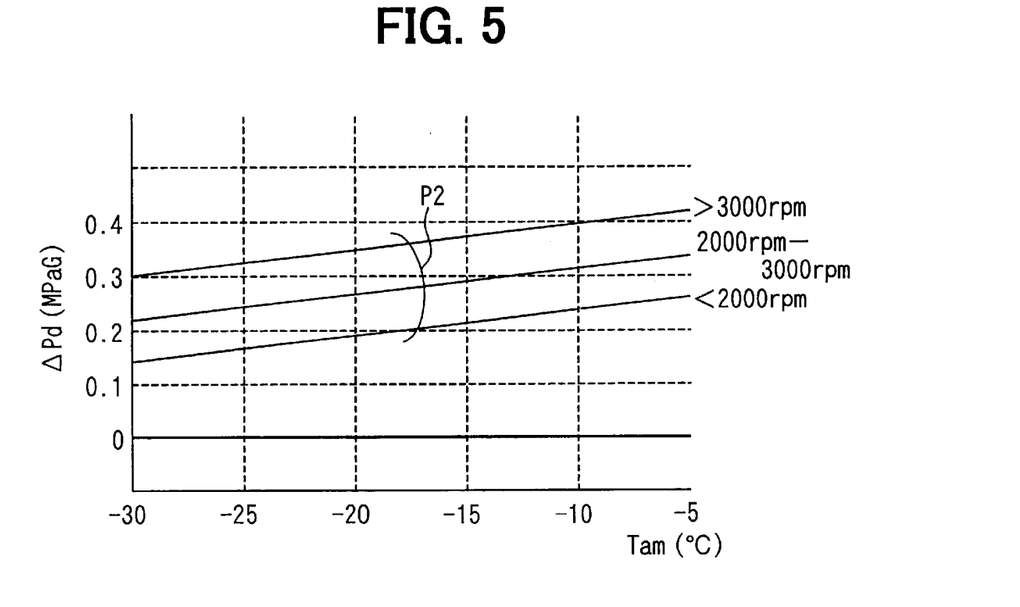
FIG. 5 is a graph showing correction characteristics of an upper limit value of a change value of high-pressure side refrigerant pressure in a normal refrigerant state, according to the first embodiment.

In FIG. 4, the upper limit value P2 of the pressure increase range ΔPn in the refrigerant normal state is set at a constant value. However, as shown by the graph lines G3 and G4 in FIG. 4, the change value (increased valve) of the high-pressure side refrigerant pressure increases as the rotation speed of the compressor 10 increases after the start of the hot-gas heating mode. Accordingly, as shown in FIG. 5, the upper limit value P2 can be set to be increased as the rotation speed of the compressor 10 increases. For example, in FIG. 5, the upper limit value P2 is set to be changed in a case where the rotation speed of the compressor 10 is smaller than 2000 rpm, in a case where the rotation speed of the compressor 10 is in a range between 2000 rpm and 3000 rpm, and in a case where the rotation speed of the compressor 10 is larger than 3000 rpm. In this case, the refrigerant shortage in the hot gas refrigerant cycle can be more accurately determined.

Second Embodiment

The second embodiment is for preventing an error determination of the refrigerant shortage when the hot-gas heating mode is started in a state where the temperature of the vehicle engine 12 is not reduced to a level substantially equal to the outside air temperature Tam. Similarly to FIG. 5 of the first embodiment, FIG. 6 changes the upper limit value P2 of the pressure increase range ΔPn. Further, similarly to the first embodiment, the change value ΔPd is a changed pressure of the high-pressure side refrigerant pressure at the predetermined short time (i.e., 5 seconds) after the start of the hot gas heater cycle H.

Figure 6:
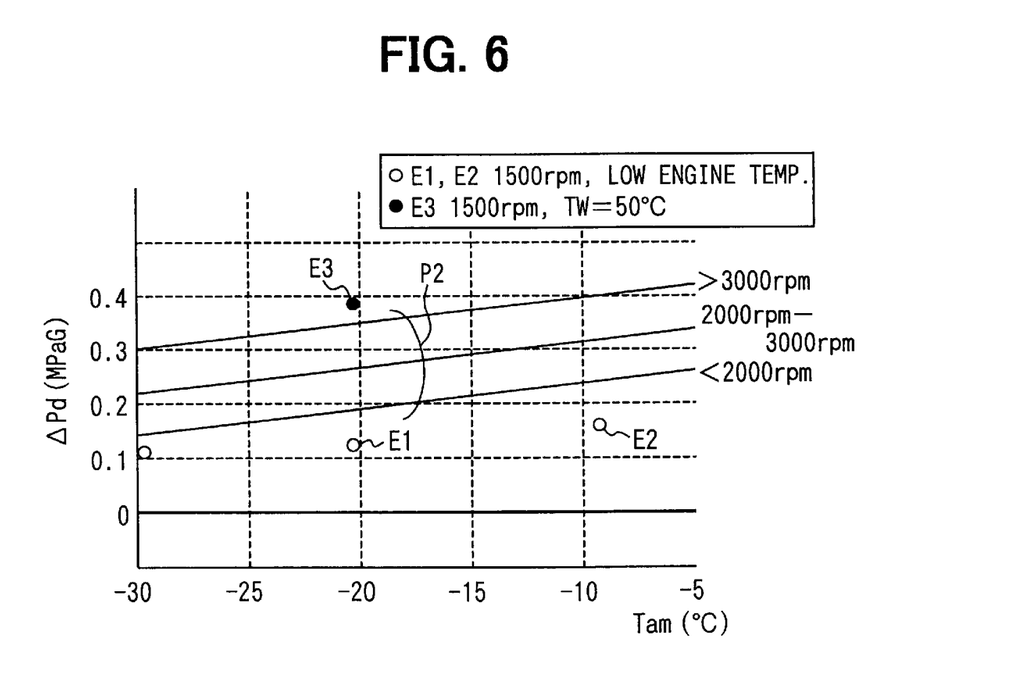
FIG. 6 is a graph showing measurement values of changed pressure of the high-pressure side refrigerant pressure, according to a second embodiment of the present invention.

In FIG. 6, E1 and E2 show a case where the hot-gas heating mode is started when the vehicle engine 12 is reduced to a temperature around the outside air temperature. That is, the hot-gas heating mode is started after the vehicle engine 12 stops for a long time. In this case, the change value ΔPd is lower than the upper limit value P2 as shown by the points E1 and E2 in FIG. 6, and it can be determined that the refrigerant amount is normal.

On the other hand, E3 shows a case where the outside air temperature Tam is −20° C. and the water temperature Tw of the vehicle engine 12 is 50° C. That is, in this case, the hot-gas heating mode is started at a temperature sufficiently higher than the outside air temperature. At the point E3 in FIG. 6, even when the rotation speed of the compressor 10 is 1500 rpm, the change value ΔPd of the high-pressure side refrigerant pressure is higher than the upper limit value P2, and the refrigerant shortage may be incorrectly determined.

When the water temperature Tw of the vehicle engine 12 is an intermediate temperature about 50° C., the temperature of the engine room around the vehicle engine 12 is increased due to heat radiation of the vehicle engine 12. Further, because the compressor 10 of the refrigerant cycle system is driven by the vehicle engine 12, compartments and pipes of the refrigerant cycle system, except for the evaporator 18, are generally exposed in the temperature of the engine room. As a result, even when the outside air temperature Tam is −20° C., the saturation pressure of refrigerant for the stop of the compressor 10 is determined by the temperature in the engine room corresponding to the water temperature Tw of the vehicle engine 12, and is relatively high. Thus, even when the outside air temperature Tam is −20° C., the density of the refrigerant at the start of the hot-gas heating mode is high, and the high-pressure side refrigerant pressure of the hot gas heater cycle H is rapidly increased after the start of the hot-gas heating mode. Therefore, at the predetermined short time of 5 seconds, the change value ΔPd is increased more than the upper limit value P2 in the refrigerant normal state, as shown by the point E3 in FIG. 6.

In view of the above-described problem, in the second embodiment, once when it is determined that the refrigerant amount in the hot gas heater cycle is normal after the start of the heating mode, the output of the normal refrigerant determination is maintained for a predetermined time period (e.g., 2 hours). Here, the predetermined time period (e.g., 2 hours) is a necessary time for reducing the temperature of the vehicle engine 12 substantially to the level of the outside air temperature Tam after the vehicle engine 12 stops.

Thus, in the second embodiment, the ECU 26 can be provided with a timer which starts when the normal refrigerant amount is determined. In this case, the output of the normal refrigerant determination can be maintained for the predetermined time period by the timer.

Alternatively, the timer for setting the predetermined time period may be omitted. In this case, the output of the normal refrigerant determination in the hot gas refrigerant cycle is maintained until the temperature of the vehicle engine 12 reduces to a predetermined temperature (e.g., 0° C.). That is, the output of the normal refrigerant determination in the hot gas refrigerant cycle can be maintained until information relative to the temperature of the vehicle engine 12 corresponds to the state of the predetermined temperature.

In the second embodiment, the other parts are similar to those of the above-described first embodiment.

Third Embodiment

In the above-described second embodiment, there is described regarding the error determination of the refrigerant shortage when the hot-gas heating mode starts when the temperature of the vehicle engine 12 is greatly higher than the outside air temperature in the cold winter. However, the hot-gas heating mode may be started after a heating of the vehicle engine 12 is performed and the water temperature Tw is increased to an intermediate temperature about 50° C. after the vehicle engine 12 starts. In this case, similarly to the reason of the above-described second embodiment, even when the refrigerant amount is in the normal state, the change value $\Delta Pd$ of the high-pressure side refrigerant pressure at the predetermined short time (e.g., 5 seconds) after the start of the hot-gas heating mode becomes higher than the upper limit value P2, and the refrigerant shortage may be incorrectly determined.

Figure 7:
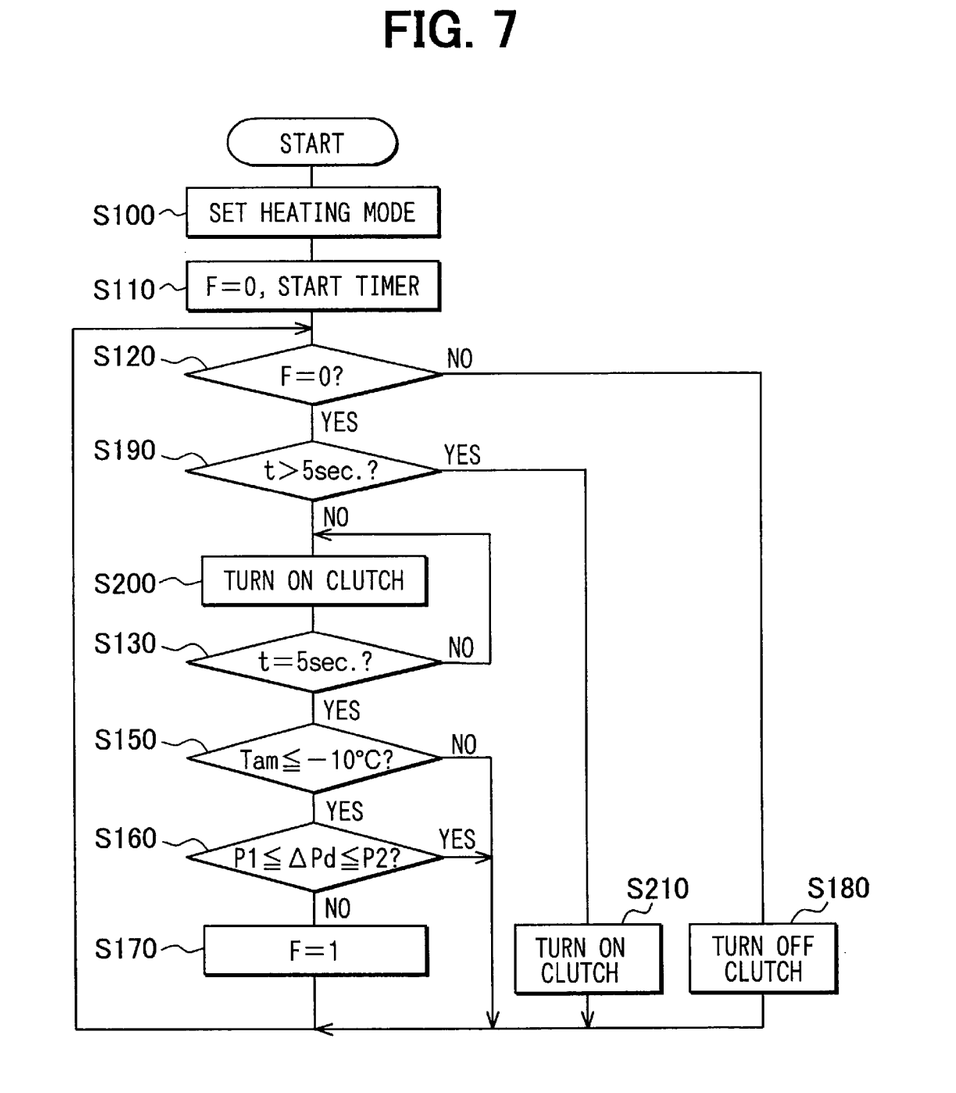
FIG. 7 is a flow diagram for determining a refrigerant shortage in a hot-gas heating mode according to a third embodiment of the present invention.

In the third embodiment, the start operation of the hot-gas heating mode is operatively linked with the start operation of the vehicle engine 12. That is, the hot-gas heating mode is started in connection with the start of the vehicle engine 12, and it is determined whether or not the refrigerant amount is the normal state. The determination of the refrigerant amount state is determined based on the flow diagram in FIG. 7. The control program of FIG. 7 is started when the vehicle engine 12 starts in a low outside air temperature. Specifically, in a case where the outside air temperature is lower than a predetermined low temperature (e.g., 5° C.) and the water temperature Tw of the vehicle engine 12 is reduced to a temperature around the outside air temperature, when the ignition switch of the vehicle engine 12 is turned on, the control in FIG. 7 starts. In FIG. 7, the controls at steps S100–S170 are similar to those in FIG. 3.

As shown in FIG. 7, at step S190, it is determined whether or not the timer time t passes the predetermined short time (e.g., 5 seconds) that is a necessary time for determining refrigerant shortage based on the change value $\Delta Pd$ of the high-pressure side refrigerant pressure after the start of the hot-gas heating mode. When the timer time t is equal to or shorter than the predetermined short time (e.g., 5 seconds), the electromagnetic clutch 11 is turned on and the compressor 10 is operated at step S200.

When it is determined that the timer time t is 5 seconds at step S130, the determination of the refrigerant shortage is performed based on the change value $\Delta Pd$ of the high-pressure side refrigerant pressure at step S160. When the determination at step S160 is NO, the refrigerant shortage is determined, and the flag F is set at 1 (i.e., F=1) at step S170. Thereafter, the determination at step S120 is NO, control program moves from step S120 to step S180, and the electromagnetic clutch 11 is turned off. The information of F=1 is maintained while the vehicle engine 12 operates. Accordingly, even when the hot gas switch 29b is turned on and the hot-gas heating mode is set, the turning-off state of the electromagnetic clutch 11 is maintained. Therefore, the compressor 10 is not started, and is protected.

On the other hand, when the refrigerant amount is normal, the determination at step S160 is YES, and the flag F is maintained at 0. Thereafter, the control program moves from step S190 to step S210, and the electromagnetic clutch 11 is turned on.

In the above-described third embodiment, the hot-gas heating mode is started substantially at the same time as the start of the vehicle engine 12. However, the hot-gas heating mode can be started slightly later after the start of the vehicle engine 12. In this case, it can prevent the driving load of the compressor 10 from being applied to the starter when the vehicle engine 12 starts.

When the hot-gas heating mode starts in a short time after the start of the vehicle engine 12, the temperature of the engine room around the vehicle engine 12 substantially does not increase, and the refrigerant shortage determination is not affected.

Other embodiments

In the above-described embodiments, the stop of the compressor 10 is described when the refrigerant shortage is determined. However, when the refrigerant shortage is determined, the refrigerant shortage can be indicated simultaneously with the stop of the compressor 10. For example, as an indication means for indicating the refrigerant shortage, an indication light that lights in the refrigerant shortage can be provided on the air conditioning operation panel 28.

Here, in the above-described embodiments, the air conditioning operation panel 28 is provided with the hot gas switch 29b manually operated by the occupant, and the hot-gas heating mode is set by turning on the hot gas switch 29b. However, when the ECU 26 determines the maximum heating state and the like, the hot-gas heating mode can be automatically started without providing the dedicated manually operated switch.

Moreover, in the manually operated air conditioner, the air conditioning operation panel 28 is provided with a dial-shaped or lever-shaped temperature adjusting operation member for manually operating temperature adjusting units such as an air mix door for adjusting the ratio of the quantity of warm air to the quantity of cool air and a hot water valve for adjusting a hot water flow rate in the heater core. Therefore, when this temperature adjusting operation member is operated to the maximum heating position, the hot gas switch 29b can be turned on in accordance with the operation of the temperature adjusting operation member. This can eliminate the operation member dedicated for the hot gas switch 29b.

Such changes and modifications are to be understood as being within the scope of the present invention as defined by the appended claims.

What is claimed is:

1. A refrigerant cycle system comprising:
   a compressor for compressing refrigerant;
   an exterior heat exchanger disposed outside a compartment;
   an interior heat exchanger disposed inside the compartment;
   a first decompression device that decompresses refrigerant in a cooling mode for cooling the compartment by air passing through the interior heat exchanger;
   a second decompression device that decompresses refrigerant in a hot-gas heating mode for heating the compartment by air passing through the interior heat exchanger, the second decompression device being disposed in a hot gas bypass passage through which refrigerant discharged from the compressor is directly introduced into the interior heat exchanger while bypassing the exterior heat exchanger;

a switching device disposed for switching a cooling refrigerant cycle where refrigerant discharged from the compressor is returned to the compressor through the exterior heat exchanger, the first decompression device and the interior heat exchanger so that the cooling mode is set, and a hot gas heater cycle where the refrigerant discharged from the compressor is directly introduced to the interior heat exchanger through the hot gas bypass passage so that the hot-gas heating mode is set; and a control unit for controlling operation of the compressor, wherein:

the control unit includes
calculation means for calculating a pressure difference between a pressure of a high-pressure refrigerant in the hot gas heater cycle before being decompressed at a start time of the hot-gas heating mode, and a pressure of the high-pressure refrigerant at a predetermined time after the start of the hot-gas heating mode, and determining means for determining whether a refrigerant amount in the hot gas heater cycle is in a normal state or a shortage state; and the determining means determines the normal state of the refrigerant amount when the pressure difference is within a predetermined range, and determines the shortage state of the refrigerant amount when the pressure difference is outside the predetermined range.

2. The refrigerant cycle system according to claim 1, wherein:

the predetermined range has an upper limit value and a lower limit value; and the determining means determines the shortage state of the refrigerant amount when the pressure difference is larger than the upper limit value or lower than the lower limit value, when temperature of outside air is equal to or lower than a predetermined outside temperature.

3. The refrigerant cycle system according to claim 2, wherein the predetermined outside temperature is −10° C.

4. The refrigerant cycle system according to claim 2, wherein the upper limit value is set to be changed in accordance with a rotation speed of the compressor.

5. The refrigerant cycle system according to claim 1, wherein the control unit stops the operation of the compressor when the determining means determines the shortage state of the refrigerant amount.

6. The refrigerant cycle system according to claim 1, wherein the predetermined range is corrected by a rotation speed of the compressor.

7. The refrigerant cycle system according to claim 1, wherein:

the compressor is driven by an engine of a vehicle; and when the determining means determines the normal state of the refrigerant amount, the control unit maintains a determination output of the normal state of the refrigerant amount until information relative to temperature of the engine becomes a state corresponding to a temperature equal to or lower than a predetermined temperature.

8. The refrigerant cycle system according to claim 1, wherein:

the compressor is driven by an engine of a vehicle; and the control unit starts the hot-gas heating mode to be operatively linked with a start operation of the engine, and the determining means determines the normal state or the shortage state of the refrigerant amount in the hot gas heater cycle.

* * * * *